April 28, 1964     O. GÜPNER     3,131,041
COUNTERCURRENT GAS WASHER WITH PROGRESSIVE CENTRIFUGAL FORCE
Filed Nov. 20, 1961     2 Sheets-Sheet 1

Inventor:
Otto Güpner
By Bailey, Stephens + Huettig
Attorneys

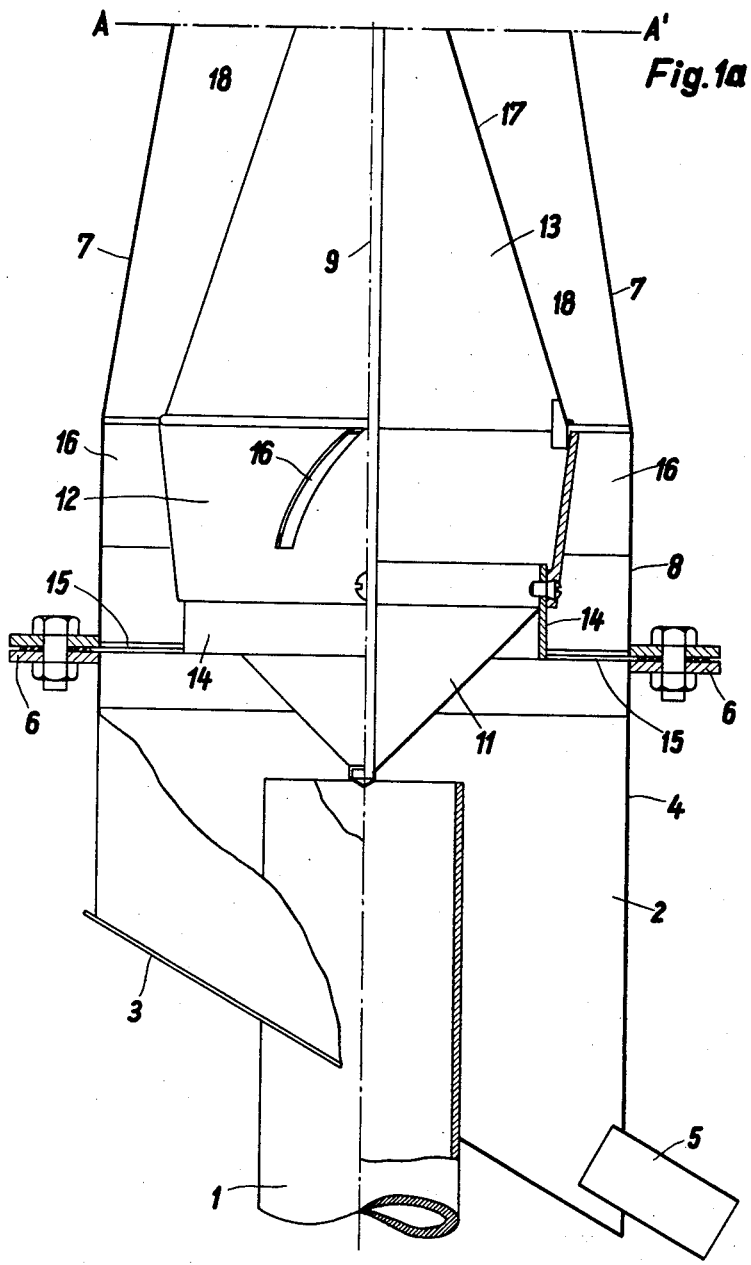

3,131,041
COUNTERCURRENT GAS WASHER WITH PROGRESSIVE CENTRIFUGAL FORCE

Otto Güpner, Offenbach (Main), Germany, assignor to Metallgesellschaft Aktiengesellschaft, Frankfurt am Main, Germany
Filed Nov. 20, 1961, Ser. No. 153,645
Claims priority, application Germany Dec. 1, 1960
7 Claims. (Cl. 55—235)

This invention is directed to an apparatus for the cleaning of gases.

Venturi tube type apparatuses have been used for the cleaning of gases, in addition to other types of washers. As shown in the German disclosure DAS 1,071,673, the gas and cleaning fluid are in concurrent flow. Furthermore, as shown in Johnstone et al. U.S. Patent No. 2,604,185, the cleaning fluid is injected transversely into the gas flow. In both of these disclosures, the dirty gas passes with a high axial velocity through the neck of the venturi tube wherein it is mixed with the injected cleaning fluid so that the cleaning fluid is carried onward by the gas through the venturi tube and intimately mixed with the gas.

When the cleaning fluid is injected in countercurrent flow to the gas, the disadvantage arises in that turbulent swirls are created which produce substantial pressure variations throughout the apparatus.

In the venturi washer of this invention, at a point where there is a relatively low axial gas velocity, a circumferential velocity is given to the gas by means of a vane or baffle which creates a swirl. Then this circumferential velocity is substantially increased in a direction toward the cleaning fluid injection nozzle, while the axial velocity remains constant up to the last third portion of the washer. The axial velocities at the individual cross-sectional areas are set with regard to the kinetic energy of the injected water particles in each cross-sectional area, so that layers of water swirls are avoided throughout the washer, and on the other hand, the axial gas flow velocity is high enough so that the greatest possible relative velocity is maintained between the injected water particles and the gas that is being cleaned. The apparatus of this invention achieves this result, because the gas being cleaned flows through the venturi washer in a manner reversed from what has heretofore been customary, that is from the largest cross-section of the venturi toward the smallest cross-section, such being the venturi neck, at which point a cleaning fluid nozzle is positioned for producing a conical spray which strikes the neck portion of the washer. At the inlet to the washer, a downwardly directed cone is provided to uniformly distribute the incoming gas around the body to which the vanes are attached. These vanes create a gas swirl at a point where the axial gas flow is so small that the water or cleaning fluid in countercurrent flow drains off downwardly and thus keeps the complete apparatus free of dust deposits. By means of a conical body positioned in the inlet portion of the venturi tube, the centrifugal forces are progressively increased, while a constant swirl is maintained according to the laws of potential flow under transformation of static energy into kinetic energy in such a manner that the venturi neck, where the water has its greatest kinetic energy, a high centrifugal effect is obtained along with an axial gas velocity which is low with respect to the circumferential gas velocity.

In a further feature of this invention, at the venturi outlet, means are provided for obtaining a rapid decrease in the circumferential gas velocity with a simultaneous recovery of the static pressure energy. This is possible because the precipitation of the dust and water particles which have a large mass inertia and are still present in the gas, can be utilized for a further separation of the gas and water particles. To this end, a conical deflecting surface is mounted at the outlet end of the venturi and around the cleaning fluid nozzle. A further feature is in that an additional cyclone cleaning is obtained by reason of an upper collecting chamber which encloses the outlet end of the venturi in conjunction with the cleaning gas pipe which projects into the chamber.

The washer of this invention combines the advantages of a countercurrent washer with those of a venturi washer so that an additional separation of the dirty particles is achieved by the gas swirl and also a better cooling of the gas results. Layers of gas swirls are avoided which cannot be avoided in conventional swirl stream washers because of the low axial velocity and the high circumferential gas velocity obtained by this invention. The preferably vertically arranged apparatus also is space-saving as contrasted to conventional apparatuses.

The means by which the objects of the invention are obtained are described more fully with reference to the accompanying drawings, in which:

FIGURE 1a is a similar view of the lower half of the washer.

FIGURES 1 and 1a illustrate the complete washer when joined on the dot-dash line A—A'.

Figure 1:
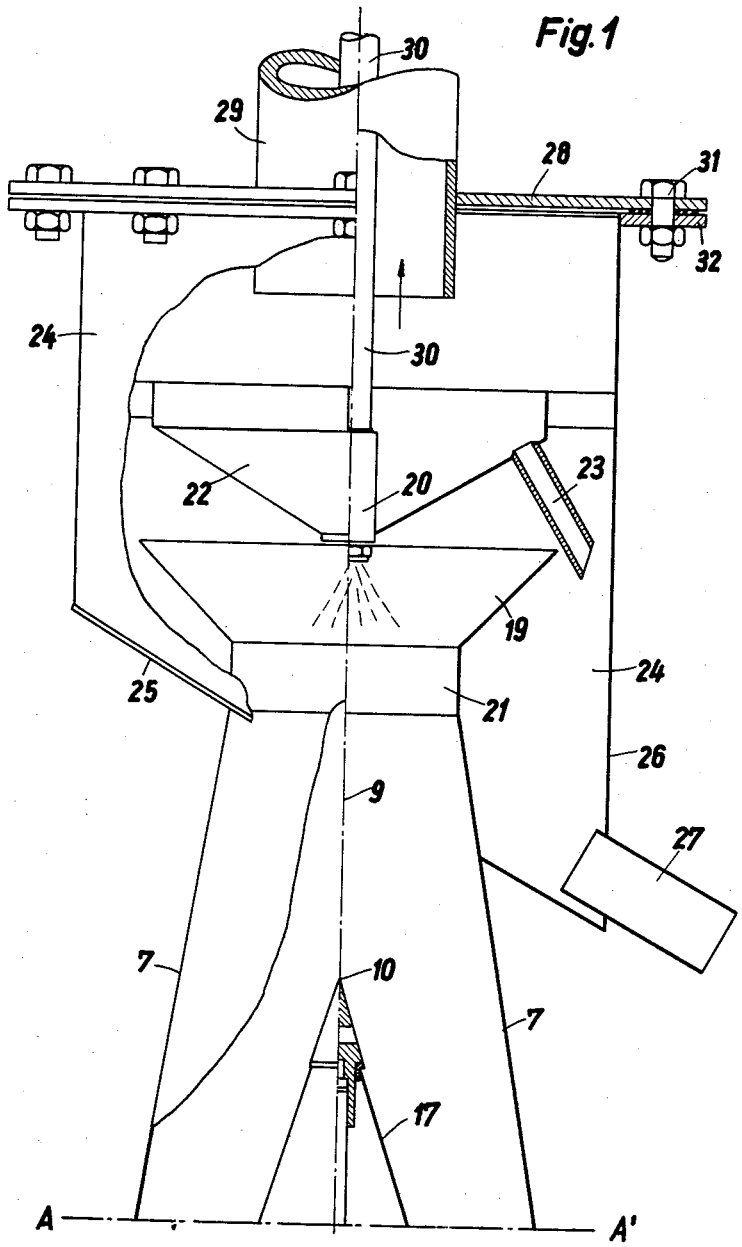
FIGURE 1 is a front elevational view partially in section of the upper half of the centrifugal washer.

As shown in FIGURE 1a, the dirty gas passes through pipe 1 into a bottom collecting chamber 2, which has an inclined bottom 3 extending to the lowermost point of wall 4, at which point there is attached a drain pipe 5. Chamber 2 is joined by flanges 6 to the venturi conical inlet portion 7 through the medium of a cylindrical portion 8. Concentric with the longitudinal axis 9 of the washer is a downwardly directed gas deflecting cone 11 extending slightly into chamber 2 and having its space joined to a truncated separating cone 12. A conical body 13 has its base secured to the upper edge of truncated cone 12. Cylindrical member 14 is secured to cone 12 and, in turn, is supported by struts 15 fastened to flange 6. Curved vanes or baffles 16 are joined to cone 12 and serve to impart a swirl to the rising gas at the entrance to the venturi inlet portion 7 and at the widest portion of the apparatus. The apex 10 of conical body 13 extends to about two-thirds the height of the venturi inlet portion 7.

The surface 17 of conical body 13 extends at an angle with respect to inlet portion 7 so as to produce a space 18, the cross-sectional area of which is constant at any point from the base of conical body 13 to the apex 10.

At the upper end of the washer, the expansion outlet portion 19 of the venturi extends slightly beyond a downwardly directed conical spray nozzle 20, which is situated to direct a conical spray of fluid into and against the inner wall of the neck 21 joining portions 7 and 19. This downwardly directed fluid is countercurrent to the rising gas.

Slightly above and surrounding nozzle 20 is a downwardly directed conical gas deflecting member 22 which has an opening angle preferably larger than 90°. A drain pipe 23 extends from member 22 in order to drain off dirty water collecting in member 22 into upper collecting chamber 24. This upper chamber likewise has an inclined bottom floor 25 extending to the lowest point of wall 26, at which point is positioned a drain pipe 27. Upper chamber 24 is closed off by a cover 28 through which extends a clean gas exhaust pipe 29 and the clean water line 30 for the nozzle 20. Cover 28 is secured by means of bolts 21 to a flange 32 at the upper edge of chamber 24.

In operation, the dirty gas enters through pipe 1 into chamber 2 with the rising gas being deflected by conical member 11 radially outward. In the meanwhile, water particles from nozzle 20 are falling downward in counter current flow. The largest particles of dust are precipitated adjacent member 11 and drop to the inclined bottom 3 of the chamber to be drained out through pipe 5. The rising gas flows by truncated cone 12 and is given a rotational motion or a swirl by baffles 16. The venturi inlet portion 7 substantially increases the centrifugal forces in the rising gas as initially produced by the baffles 16. However, the vertical velocity of the gas along the longitudinal axis of the washer remains constant while the gas is flowing in the space 18 between conical body 13 and inlet portion 7 because the cross-sectional area of this space is constant throughout its length. By this means, large centrifugal forces with a high velocity gas swirl and a relatively low vertical gas velocity occurs at the narrowest part of the venturi, namely at the neck 21. The cleaning fluid, such as water, which is injected through nozzle 20 at a pressure of, for example, 5 atmospheres becomes intimately mixed with the gas because of the relative high velocity between the gas and the countercurrent flowing water. Formation of layers or swirls of gas is avoided by proper choice of the individual velocities. In addition, hot gases are cooled to a substantial degree. The dirt, such as dust or oil, that is cleaned from the gas flows downwardly with the water particles and the flow of water keeps clean the surfaces of the conical body 13, the truncated cone 12 and the baffles 16 by reason of the constant spraying. The dirty water drains onto the inclined bottom 3 and out the drain pipe 5. The rising gas emitted from the venturi outlet portion 19 contacts the deflecting member 22 which results in a further water separation by reason of the sharp deflection. The clean gas while still swirling flows into the upper portion of collection chamber 24 which functions as a cyclone cleaner because of the swirling action and constricted inlet to the clean gas outlet pipe 29. Such cyclone action substantially removes any dust and dirt particles remaining in the gas.

Having now described the means by which the objects of the invention are obtained, I claim:

1. An apparatus for washing gases with a countercurrent flow of liquid comprising a venturi composed of a conical gas inlet portion, a neck portion and a conical gas expansion outlet portion, a liquid spray nozzle mounted coaxially with and at the outlet end of said expansion portion for directing a cone shaped spray of liquid into said neck portion and counter to the flow of gas through said neck portion to mix with and wash the gas flowing through said inlet portion, a conical body mounted within said venturi inlet portion and spaced from said inlet portion and having its base flush with the base of said inlet portion, vane means mounted adjacent the bases for forming a gas swirl in the space between said conical body and said inlet portion, and said gas inlet portion and said conical body having wall slopes related to each other such that the cross-sectional area between them is constant at any point for giving the gas a substantially constant axial velocity through said space with increased centrifugal force.

2. An apparatus as in claim 1, further comprising a downwardly directed truncated separating cone having its base joined to the base of said conical body, and a second cone of less height than said conical body having its base joined to said truncated cone.

3. An apparatus as in claim 2, said second cone being about one-third the height of said conical body.

4. An apparatus as in claim 3, further comprising a gas deflecting member surrounding said liquid spray nozzle and having an opening angle greater than 90°.

5. An apparatus as in claim 4, further comprising an upper collecting chamber enclosing said gas deflecting member and forming the gas outlet end of said apparatus, and a clean gas exhaust pipe extending into said chamber.

6. An apparatus as in claim 5, further comprising a bottom collecting chamber secured to said conical gas inlet portion, said upper and said bottom chamber each having an inclined floor, and a dirty water drain pipe joined to the lowest part of each floor.

7. An apparatus as in claim 6, further comprising a gas inlet pipe extending through the center of said bottom chamber floor and axially aligned with said apparatus.

References Cited in the file of this patent

UNITED STATES PATENTS

| 2,234,735 | Lambert et al. | Mar. 11, 1941 |
| 2,871,973 | Roujob | Feb. 3, 1959 |

FOREIGN PATENTS

| 359,739 | Great Britain | Oct. 29, 1931 |
| 439,106 | France | Mar. 30, 1912 |
| 514,911 | Great Britain | Nov. 21, 1939 |
| 764,429 | Great Britain | Dec. 28, 1956 |
| 952,858 | France | May 9, 1949 |